(12) United States Patent
Lee et al.

(10) Patent No.: US 9,465,884 B2
(45) Date of Patent: Oct. 11, 2016

(54) SYSTEM AND METHOD FOR MONITORING WEB CONTENT

(75) Inventors: Hyun Chul Lee, Thornhill (CA); Byron Bondling Ma, Toronto (CA); Kyu Lee, Thornhill (CA)

(73) Assignee: Rogers Communications Inc., Toronto, Ontario (CA)

( * ) Notice: Subject to any disclaimer, the term of this patent is extended or adjusted under 35 U.S.C. 154(b) by 1324 days.

(21) Appl. No.: 12/775,620

(22) Filed: May 7, 2010

(65) Prior Publication Data

US 2011/0276681 A1 Nov. 10, 2011

(51) Int. Cl.
| | |
|---|---|
| G06F 15/173 | (2006.01) |
| G06F 17/30 | (2006.01) |
| G06F 17/28 | (2006.01) |
| G06F 17/18 | (2006.01) |
| G06Q 10/06 | (2012.01) |

(52) U.S. Cl.
CPC ......... *G06F 17/30899* (2013.01); *G06F 17/18* (2013.01); *G06F 17/28* (2013.01); *G06F 17/30864* (2013.01); *G06Q 10/06* (2013.01)

(58) Field of Classification Search
USPC ................... 709/224; 707/E17.009, 999.003; 700/100, 106
See application file for complete search history.

(56) References Cited

U.S. PATENT DOCUMENTS

| | | | | |
|---|---|---|---|---|
| 6,611,726 | B1 * | 8/2003 | Crosswhite | G06F 17/18 700/100 |
| 8,315,849 | B1 * | 11/2012 | Gattani | G06F 17/28 704/10 |
| 2005/0198021 | A1 * | 9/2005 | Wilcox | G06Q 10/06 |
| 2009/0037421 | A1 * | 2/2009 | Gamble | G06F 17/30864 |
| 2009/0132581 | A1 | 5/2009 | Ahlberg | |
| 2009/0204575 | A1 | 8/2009 | Olston et al. | |
| 2009/0248668 | A1 | 10/2009 | Zheng et al. | |

FOREIGN PATENT DOCUMENTS

EP 2131292 12/2009

OTHER PUBLICATIONS

Sia (("Efficient Monitoring Algorithm for Fast News Alerts", IEEE Transactions on Knowledge and Data Engineering, vol. 19, No. 7, pp. 950-961, Jul. 2007).*
Junghoo Cho, Alexandros Ntoulas: Effective Change Detection Using Sampling. VLDB 2002: 514-525.
Junghoo Cho, Hector Garcia-Molina: Effective page refresh policies for Web crawlers. ACM Trans. Database Syst. 28 (4): 390-426 (2003).
Junghoo Cho, Hector Garcia-Molina: Estimating frequency of change. ACM Trans. Internet Techn. 3(3): 256-290 (2003).

(Continued)

*Primary Examiner* — Kyung H Shin
(74) *Attorney, Agent, or Firm* — Rowand LLP

(57) ABSTRACT

A system and method of monitoring content stored at a plurality of locations in a location set are provided. The method comprises: determining two or more historic attributes for a first feature associated with each location; for each location in the location set, determining a first predicted attribute for the first feature associated with that location based on the historic attributes for that first feature and that location; determining a monitoring schedule in accordance with the first predicted attribute; and monitoring the content at the locations in the location set according to the monitoring schedule.

20 Claims, 6 Drawing Sheets

(56) References Cited

OTHER PUBLICATIONS

Panagiotis G. Ipeirotis, Alexandros Ntoulas, Junghoo Cho, Luis Gravano: Modeling and Managing Content Changes in Text Databases.ICDE 2005: 606-617.

Ka Cheung Sia, Junghoo Cho, Hyun-Kyu Cho: Efficient Monitoring Algorithm for Fast News Alerts. IEEE Trans. Knowl. Data Eng. 19(7): 950-961 (2007).

David J. Wright, Forecasting Data Published at Irregular Time Intervals Using an Extension of Holt's Method, Management Science 1986 32: 499-510.

Ratnasamy et al.: A Scalable ContentAddressable Network. In Proceedings of ACM SIGCOMM 2001.

Focused Crawling with Scalable Ordinal Regression Solvers http://drona.csa.iisc.ernet.in/~chiru/papers/RaSaKrSiBhMu07.pdf.

Profile-Based Focused Crawling for Social Media-Sharing Websites, Zhiyong Zhang and Olfa Nasraoui.

Topical Web Crawlers: Evaluating Adaptive Algorithms, Filippo Menczer and Padmini Srinvasan.

Sia, K.C. et al., "Efficient Monitoring Algorithm for Fast News Alerts," IEEE Transactions on Knowledge and Data Engineering, vol. 19, No. 7, pp. 950-961, Jul. 2007.

Iiarri, S. et al., "Processing of Data Streams with Prediction Functions", Proceedings of the 39th Annual Hawaii International Conference on System Sciences, HICSS '06, track 9, pp. 1-10, Jan. 4-7, 2006.

Written Opinion and International Search Report dated Jan. 27, 2011.

\* cited by examiner

SYSTEM AND METHOD FOR MONITORING WEB CONTENT

TECHNICAL FIELD

The present disclosure relates generally to the monitoring of dynamic content. More specifically, it relates to a method and system for monitoring content, such as web-pages, which are stored at a plurality of locations in a location set.

BACKGROUND

Monitoring web-page content and fetching web-page content may be useful in systems which index or classify such content. For example, search engines, news aggregation services, and other indexing and classification systems may re-visit web-pages from time to time in order to determine whether content associated with those web-pages has changed. Where content has changed, such systems may update indexing and classification data.

Monitoring and fetching systems often visit web-pages in a predetermined fixed order. This approach to monitoring and fetching may be less effective when monitoring highly dynamic web-pages and web-content. For example, visiting web-pages in a predetermined fixed order may be inefficient for monitoring web-pages which are micro-blogs, such as Twitter™.

Thus there exists a need for improved systems and for monitoring content stored at a plurality of locations.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

In one aspect the present disclosure provides a method of monitoring content stored at a plurality of locations in a location set. The method comprises: determining two or more historic attributes for a first feature associated with each location; for each location in the location set, determining a first predicted attribute for the first feature associated with that location based on the historic attributes for that first feature and that location; determining a monitoring schedule in accordance with the first predicted attribute; and monitoring the content at the locations in the location set according to the monitoring schedule.

In another aspect, the present application provides a content monitoring system for monitoring content stored at a plurality of locations in a location set. The system comprises a prediction component. The prediction component is configured to determine two or more historic attributes for a first feature associated with each location. The prediction component is further configured to, for each location in the location set, determine a first predicted attribute for the first feature associated with that location based on the historic attributes for that first feature and that location. The system further comprises a scheduling component configured to determine a monitoring schedule in accordance with the first predicted attribute. The system further comprises a monitoring component configured to monitor the content at the locations in the location set according to the monitoring schedule.

Other aspects and features of the present application will become apparent to those ordinarily skilled in the art upon review of the following description of specific embodiments of the application in conjunction with the accompanying figures.

Figure 1:
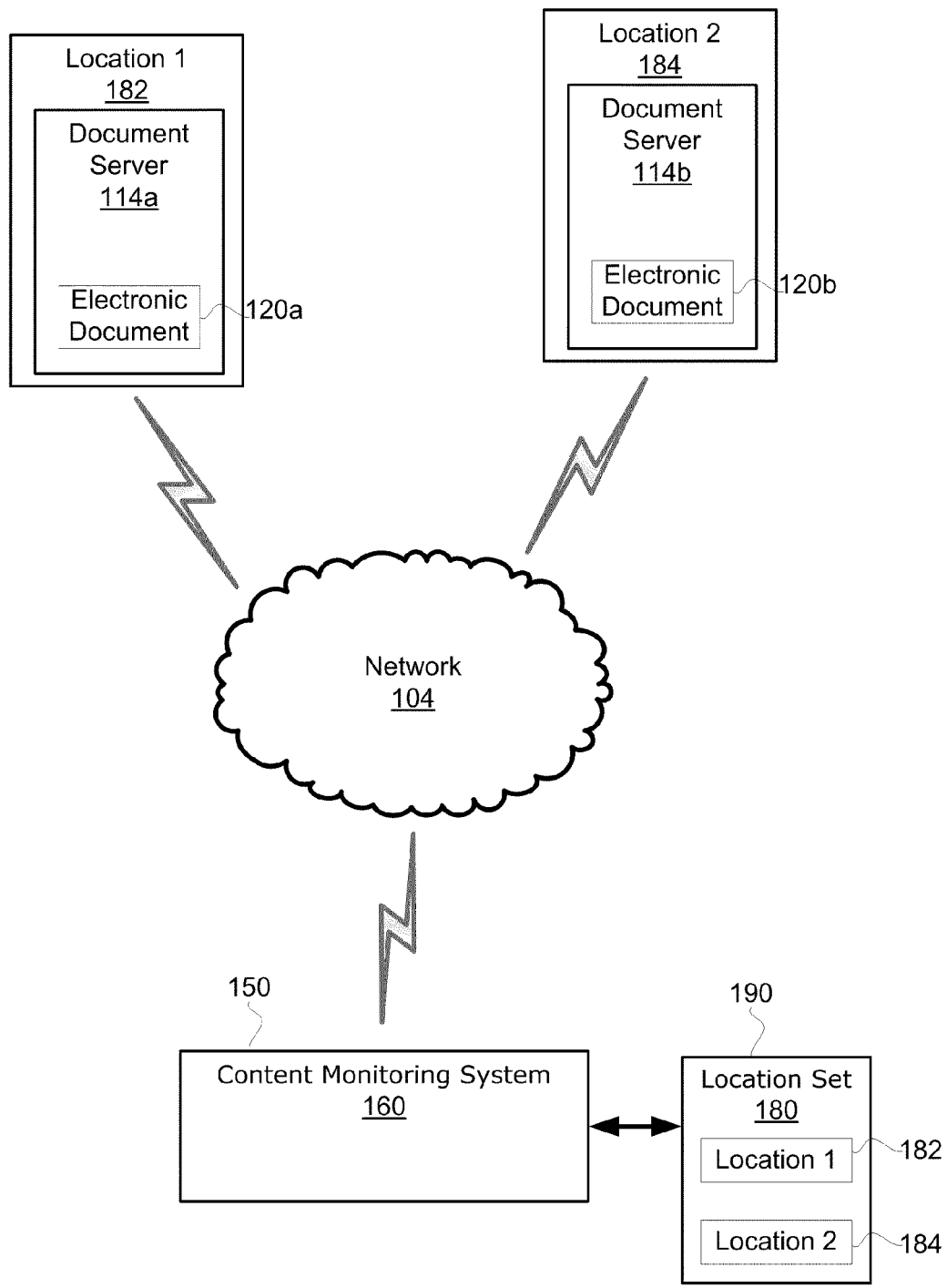
FIG. 1 shows a system diagram illustrating a possible environment in which embodiments of the present application may operate.

Reference is first made to FIG. 1, which illustrates a system diagram of a possible operating environment in which embodiments of the present disclosure may operate.

In the embodiment of FIG. 1, a content monitoring system 160 is illustrated. The content monitoring system 160 is configured to monitor content of electronic documents 120*a*, 120*b* located at a plurality of locations 182, 184, which may be identified in a location set 180. That is, the content monitoring system 160 is configured to monitor electronic documents 120*a*, 120*b* located at a set of locations 182, 184 defined by a location set 180. The location set 180 is stored in a storage 190 which is accessible by the content monitoring system 190. The storage 190 may, in some embodiments, be internal storage of the content monitoring system 160. In other embodiments, the storage 190 may be external storage of the content monitoring system 160, including, for example, network storage accessible through a network 104.

The electronic documents 120*a*, 120*b* may vary over time. That is, the content of an electronic document 120*a*, 120*b* located at any given location 182, 184 may vary over time.

The electronic documents 120*a*, 120*b* may, in various embodiments, be one or more of: Really Simple Syndication ("RSS") feeds or other cascaded feeds, blogs, micro-blogs such as Twitter™, on-line news sources, user-generated comments from web-pages, etc. Other types of electronic documents 120*a*, 120*b* are also possible. By way of example and not limitation, the electronic documents 120*a*, 120*b* may be formatted in a Hyper-Text Markup Language ("HTML") format, a plain-text format, or a portable document format ("PDF"). In some instances, the electronic documents 120*a*, 120*b* may be an image, such as a JPEG or Bitmap image. Other document formats are also possible.

The electronic documents 120*a*, 120*b* may be located at associated locations 182, 184 on a plurality of document servers 114*a*, 114*b*, which may be accessible through a network 104, such as the Internet. In some embodiments, the document servers 114 may be publicly and/or privately accessible web-pages which may be identified by a unique Uniform Resource Locator ("URL"). In such embodiments, the locations 182, 184 may be URLs.

The network 104 may be a public or private network, or a combination thereof. The network 104 may be comprised of a Wireless Wide Area Network (WWAN), a Wireless Local Area Network (WLAN), the Internet, a Local Area Network (LAN), or any combination of these network types. Other types of networks are also possible and are contemplated by the present disclosure.

The location set 180 which defines the locations 182, 184 of the electronic documents 120a, 120b which are to be monitored may be stored on the storage 190.

The storage 190 may include non-volatile memory such as, for example, a Hard Disk Drive (HDD), Flash Memory, or other types of memory. In some embodiments, the storage 190 may include a combination of different types of memory.

The content monitoring system 160 may include functionality in addition to the ability to monitor the content of electronic documents 120a, 120b located at locations 182, 184. For example, as illustrated in FIG. 1, in some embodiments, the content monitoring system 160 may be a document aggregation system 150. The document aggregation system 150 may be configured to search document servers 114a, 114b to locate and/or group electronic documents 120a, 120b which are related to a common subject matter.

The electronic documents 120a, 120b may, in some embodiments, be news-related documents which contain information about recent, interesting, topical and/or important events. In such cases, the document aggregation system 150 may also be referred to as a news aggregation system. The news aggregation system may be configured to locate and group electronic documents 120a, 120b which are related to a common event or story.

The locations 182, 184 in the location set 180 may be predefined fixed locations. The locations 182, 184 may, in some embodiments, be specified, in whole or in part by a user of the content monitoring system 160, such as, for example, a system administrator.

In other embodiments, the location set may be dynamic. In such embodiments, the content monitoring system 160 (which may be a document aggregation system 150) may include a document search subsystem (not shown). The document search subsystem (not shown) may be used by the document aggregation system 150 to locate documents accessible through the network 104, which may be located at locations which are not identified in the location set 180. The document search subsystem may be configured to search document servers 114a, 114b based on a search algorithm in order to identify electronic documents 120a, 120b matching a search criteria. By way of example, in some embodiments, the search algorithm may provide for searching of websites (or other document servers 114a, 114b) of a specific category using a search keyword or phrase. For example, the document search subsystem may be configured to search blogs, micro blogs, and/or online traditional news sources, etc.

The document search subsystem may, in some embodiments, rely on a third party search engine which may not be physically located within the document aggregation system 150. For example, a publicly accessible search engine, such as Google™ may be used.

If the document search subsystem 150 identifies electronic documents 120a, 120b matching a search criteria, it may update the location set 180 to include the locations of those identified documents. For example, in some circumstances, the document search subsystem may search for electronic documents 120a, 120b which relate to a specific news item, such as a specific event. If any such documents are located, the location set 180 may be updated to include the location 182, 184 of those electronic documents 120a, 120b in order to cause the content monitoring system 160 to monitor the content of the documents 120a, 120b at those locations 182, 184.

In at least some embodiments, the document aggregation system 150 also includes a document classification subsystem (not shown) which associates electronic documents 120a, 120b and/or the content therein with one or more labels. For example, the document classification subsystem may associate one or more documents 120a, 120b with a phrase contained in the one or more document 120a, 120b. The label which is associated with the electronic document 120a, 120b may be used to identify the subject matter of the electronic document 120a, 120b.

The document aggregation system 150 may include other subsystems not specifically described above. By way of example, the document aggregation system 150 may, in some embodiments, include a ranking subsystem which ranks documents 120a, 120b or the subject of documents 120a, 120b based on frequency of use or frequency of occurrence. For example, the subjects of a plurality of documents 120a, 120b may be ranked by determining the frequency of occurrence of each label (such as a phrase) associated with documents 120a, 120b. The rank may indicate, in at least some embodiments, how topical the subject matter associated with that label is.

In at least some embodiments, the document aggregation system 150 may include a web-interface subsystem (not shown) for automatically generating web pages which provide links for accessing the documents 120a, 120b on the document servers 114a, 114b and other information about the documents 120a, 120b. The other information may include a machine-generated summary of the contents of the document, and the rank of the subject matter of the document as determined by the ranking subsystem (not shown). The web pages which are generated by the web-interface subsystem may group documents 120a, 120b by subject matter and/or by phrases which are used in the electronic documents 120a, 120b.

By way of further example, other subsystems of the document aggregation system 150 may also include a power subsystem for providing electrical power to electrical components of the document aggregation system 150 and a communication subsystem for communicating with the document servers 114a, 114b through the network 104.

It will be appreciated that the content monitoring system 160 (and/or the document aggregation system 150) may include more or less systems, modules, subsystems and/or functions than are discussed herein. It will also be appreciated that the functions provided by any set of systems or subsystems described above may be provided by a single system and that these functions are not, necessarily, logically or physically separated into different subsystems.

Furthermore, while FIG. 1 illustrates one possible embodiment in which the content monitoring system 160 may operate, (i.e. where the content monitoring system 160 is a document aggregation system 150) it will be appreciated that the content monitoring system 160 may be employed in any system in which it may be useful to monitor the content of electronic documents 120a, 120b located at locations 182, 184 of a location set 180.

Accordingly, the term content monitoring system 160, as used herein, is intended to include stand alone content monitoring systems which are not, necessarily, part of a larger system, and also content monitoring subsystems which are part of a larger system (which may be the same or different than the document aggregation system 150 of FIG. 1). The term content monitoring system 160 is, therefore, intended to include any systems in which the content monitoring methods described herein are included.

In at least some embodiments, the content monitoring system 160, and/or the document aggregation system 150 may be implemented, in whole or in part, by way of a processor 240 which is configured to execute software modules 260 stored in memory 250. A block diagram of one such example content monitoring system 160, is illustrated in FIG. 2.

Figure 2:
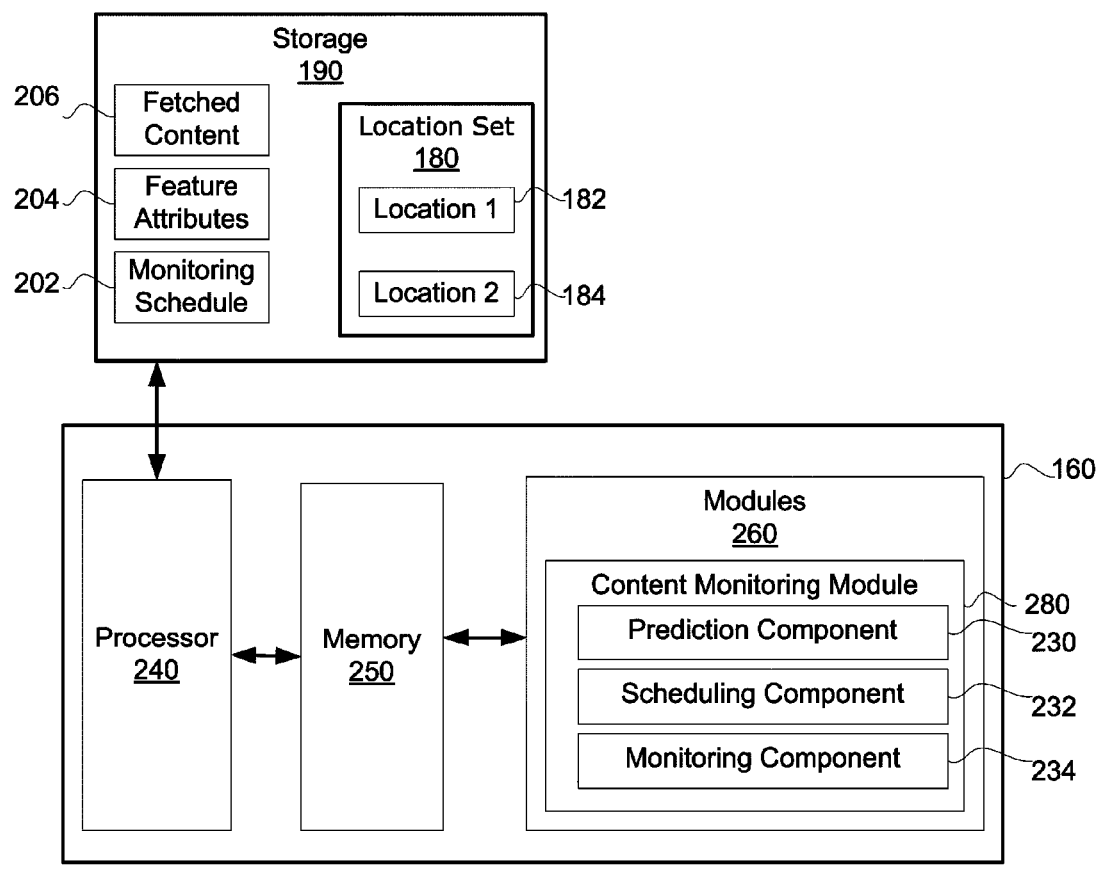
FIG. 2 shows a block diagram of a content monitoring system in accordance with an embodiment of the present disclosure.

In the embodiment of FIG. 2, the content monitoring system 160 includes a controller comprising one or more processor 240 which controls the overall operation of the content monitoring system 160. The content monitoring system 160 also includes memory 250 which is connected to the processor 240 for receiving and sending data to the processor 240. While the memory 250 is illustrated as a single component, it will typically be comprised of multiple memory components of various types. For example, the memory 250 may include Random Access Memory (RAM), Read Only Memory (ROM), a Hard Disk Drive (HDD), Flash Memory, or other types of memory. It will be appreciated that each of the various memory types will be best suited for different purposes and applications.

The processor 240 may operate under stored program control and may execute software modules 260 stored on the memory 250. The software modules 260 may be comprised of, for example, a content monitoring module 280 which is configured to monitor the content of one or more electronic documents 120a, 120b (FIG. 1) located at locations 182, 184 identified in the location set 180.

The content monitoring module 280 may include a monitoring component 234 which is configured to monitor electronic documents 120a, 120b (FIG. 1) according to a monitoring schedule 202. The monitoring schedule 202 specifies the order in which the content of electronic documents 120a, 120b at locations 182, 184 of the location set 180 are monitored.

The monitoring schedule 202 may be determined by a scheduling component 234 of the content monitoring module 280. The monitoring schedule 202 may be stored in the storage 190 by the scheduling component 232 and retrieved by the monitoring component 234. Methods of determining the monitoring schedule 202 will be discussed in greater detail below.

The monitoring schedule 202 may, in at least some embodiments, act as a queue which lists locations 182, 184 in the order in which they are to be monitored. For example, in at least some embodiments, the monitoring component 234 is configured to monitor the documents 120a, 120b at the locations 182, 184 in the monitoring schedule 202 in the order in which they are listed in the monitoring schedule.

Monitoring electronic documents 120a, 120b may, in various embodiments, include retrieving the electronic documents 120a, 120b from their respective locations 182, 184 and may also include saving the electronic documents 120a, 120b to the storage 190. That is, the monitoring component 234 may, in various embodiments, be configured to fetch the electronic documents 120a, 120b from their respective locations 182, 184 and to save the electronic documents 120a, 120b to the storage 190. For example, the electronic documents 120a, 120b may be saved in a fetched content 206 portion of the storage 190.

In at least some embodiments, monitoring electronic documents 120a, 120b may include monitoring documents referred to and/or linked to in the electronic documents 120a, 120b located at the locations 182, 184 in the location set 180. For example, the document 120a, 120b located at a location 182, 184 in the location set 180 may, in some embodiments, be a cascaded data object such as an RSS feed. In such cases, the monitoring component 234 may be configured to visit locations referred to or linked in the document that is the RSS feed, when monitoring that document. That is, the monitoring component may visit locations referred to or linked to in an RSS document in order to retrieve and/or fetch content from other documents located at the referred-to or linked-to locations.

In at least some embodiments, the monitoring component 234 may be configured to perform a duplication checking analysis on fetched content 206 before saving the content to the storage 190. The monitoring component 234 may compare the fetched content with fetched content already saved to the storage 190. If the monitoring component 234 determines that the content has not already been saved to the storage 190, it may save the content to the storage 190. Alternatively, if the monitoring component 234 determines that the content has already been saved to the storage, it may not re-save the content to the storage 190.

The monitoring component 234 may be further configured to analyze electronic documents 120a, 120b located at the locations 182, 184 of the location set 180 to determine one or more attributes associated with features of the electronic documents 120a, 120b. Each attribute may be related to a feature of the electronic documents 120a, 120b at a specific point in time. In at least some embodiments, the attribute may be related to a feature of the electronic document 120a, 120b at the point in time in which the electronic documents 120a, 120b are fetched from their respective locations 182, 184. The time which is related to each attribute is, generally, a time which has already passed. Thus, the attributes may, in at least some embodiments, be referred to as historic attributes. Since the attributes are each related to one or more features of the electronic document 120a, 120b, the attributes may also be referred to as feature attributes 204.

The feature attributes 204 may be a value, quantifier, or other attribute associated with a feature of an associated electronic document 120a, 120b at an associated point in time. That is, the feature attributes 204 serve to quantify features.

The features of the electronic documents 120a, 120b represent information about the electronic document 120a, 120b which may be used to determine how frequent the location 182, 184 associated with the document 120a, 120b will be monitored. That is, features are characteristics associated with the electronic document 120a, 120b which may be used in order to determine how often the location 182, 184 of the document 120a, 120b should be revisited for monitoring and/or how the monitoring of the document 120a, 120b should be prioritized relative to the monitoring of other documents 120a, 120b.

The features may include one or more of: an indicator of whether the document at a location was updated or not updated since a last visit to that same location, an indicator of the age of the document (for example, the elapsed time since the last change to the document), a quantifier of the number of comments associated with the electronic document 120a, 120b (for example, if the electronic document 120a, 120b is a web page which permits commenting, the comments may be a feature and the number of comments may be a feature attribute), and/or a quantifier of the number of inlinks associated with the electronic document 120a, 120b.

Inlinks are links, such as hyper-text links, which point to the electronic document 120a, 120b. The number of inlinks is not determined from the document 120a, 120b itself, but rather, from examining other documents to determine whether they link to the document 120a, 120b.

The feature may also include a feature which is a link analysis based ranking associated with the electronic document 120a, 120b. For example, a PageRank™ associated with an electronic document 120 may be a feature of that electronic document 120a, 120b. The specific value or other quantifier of the feature for each document 120a, 120b at an associated time is the feature attribute 204 for that feature. For example, a specific PageRank™ value associated with a specific electronic document 120a, 120b at a specific point in time may be an attribute of a PageRank™ feature for that electronic document 120a, 120b.

Other features apart from those specifically discussed above are also possible.

The feature attributes 204 which are determined by the monitoring component 234 may be saved to storage 190 associated with the content monitoring system 160. In at least some embodiments, the feature attributes 204 may be saved in a features database in the storage 190. Each feature attribute 204 may be saved along with a time related to that feature attribute 204. That is, the feature attributes 204 may be saved in a time-series fashion. The time may, in at least some embodiments, be the time at which the feature attributes 204 were observed or determined. In at least some embodiments, the time may be saved using POSIX time convention. However, other time formats may also be used.

In at least some embodiments, the monitoring component 234 may be configured to only record a finite number of values associated with each feature for each location 182, 184 in the location set 180. This finite number may be defined by a feature attribute threshold. Once the feature attribute threshold is met, older feature attributes 204 may be removed from storage 190 in order to make room for newer features attributes 204. For example, in some embodiments, the monitoring component 234 may be configured to record only the last k-feature attributes 204 associated with each feature for each location.

The storage 190 may, in some embodiments, be internal storage of the content monitoring system 160, such as internal memory of the content monitoring system 160. In other embodiments, the storage 190 may be external storage which is accessible by the content monitoring system 160. For example, the storage 190 may, in some embodiments, be network storage.

The content monitoring module 280 may also include a prediction component 230. As will be explained in greater detail below, the prediction component 230 may be configured to, for each location 182, 184 in the location set 180, determine a first predicted attribute for the first feature associated with that location based on the historic feature attributes 204 for that first feature and that location 182, 184. That is, in at least some embodiments, the prediction component 230 may, for each location 182, 184 in the location set 180, determine a future attribute for a first feature associated with that location based on historic feature attributes 204 for that first feature and that location. The prediction component 230 may attempt to determine future attributes of features based on previously observed attributes of that same feature.

For example, where the feature is an indicator of whether the document was updated or not updated since a last visit, the prediction component 230 may attempt to predict whether, at some future time, the document will be updated or not since the last visit. Similarly, where the feature is an indicator of the age of the document (for example, the elapsed time since the last change to the document), the prediction component 230 may attempt to predict what the age of the document will be at some future time. Similarly, where the feature is a quantifier of the number of comments associated with the electronic document 120a, 120b, the prediction component 230 may attempt to predict the number of comments associated with the electronic document at some future time. Similarly, where the feature is a quantifier of the number of inlinks associated with the electronic document 120a, 120b, the prediction component 230 may attempt to predict the number of inlinks associated with the electronic document 120a, 120b at some future time.

Similarly, where the feature is a link analysis based ranking associated with the electronic document 120a, 120b (such as PageRank™), the prediction component 230 may attempt to predict the link analysis based ranking associated with the electronic document 120a, 120b at some future time.

The prediction component 230 may, in at least some embodiments, include a regression computation module which performs a regression analysis on historic attributes (also known as feature attributes 204) associated with a feature and a location in order to determine predicted attributes for that same feature and location.

It will be appreciated that the historic attributes may be taken at times that are irregular. That is, since monitoring does not occur in a fixed order, the time period between successive feature attributes for any location may be variable. Accordingly, a regression analysis which does not require fixed time intervals may be utilized by the prediction component 230. For example, in at least some embodiments, a brown's double exponential smoothing method may be used. In such embodiments, a predicted attribute for a feature and a location may be determined according to the following formula:

$$\overline{X}_n = (1-V_n)\cdot\overline{X}_{n-1} + V_n X_n$$

where:

$$V_n = \frac{V_{n-1}}{b_n + V_{n-1}},$$

$$b_n = (1-\alpha)^{t_n - t_{n-1}},$$

$$\overline{X}_0 = X_0,$$

$$V_0 = 1 - (1-\alpha)^q, \text{ and}$$

$$q = \frac{\sum_0^{n-1} |t_i - t_{i+1}|}{n+1}$$

Where $\overline{X}_n$ is the predicted attribute, $\alpha$ is a smoothing parameter, n is the number of historic attributes for the feature and location which are used to determine the predicted attribute, t is the time associated with a historic attribute (i.e. $t_n$ is the time for the $n^{th}$ historic attribute for that feature and that location). $\overline{X}_{n-1}$ is a last predicted attribute, and $X_n$ is a feature attribute. The smoothing parameter is a value which is, in at least some embodiments, between the range of zero (0) to one (1). In at least some embodiments, the smoothing parameter is approximately 0.1.

In other embodiments, an extended Holt's approach may be used to perform a regression analysis. In such embodiments, a linear regression step may be performed to create a regression line using historic feature attributes 204. More particularly, if we let $S_0=A$ and $T_0=B$, where A is the intercept of the regression line at $t_0$ and B is the slope of the linear regression line. The predicted attribute can be determined by iterating through the following steps:

$$S_{n+1} = (1 - \alpha_{n+1}) \cdot [S_n + (t_{n+1} - t_n) \cdot T_n] + \alpha_{n+1} \cdot y_{n+1}$$

$$T_{n+1} = (1 - \gamma_{n+1}) \cdot T_n + \gamma_{n+1} \cdot \frac{S_{n+1} - S_n}{t_{n+1} - t_n}$$

Where variable smoothing coefficients are given as:

$$\alpha_{n+1} = \frac{\alpha_n}{\alpha_n + (1-\alpha)^{t_{n+1}-t_n}}$$

$$\gamma_{n+1} = \frac{\gamma_n}{\gamma_n + (1-\gamma)^{t_{n+1}-t_n}},$$

where $\alpha \epsilon (0,1)$ is a smoothing constant for the level and $\gamma \epsilon (0,1)$ is a smoothing constant for the slope.

The predicted attribute may be calculated as:

$$X_{t+n}(t) = S_t + n \cdot T_t$$

In other embodiments, a linear regression method may be used to determine predicted attributes.

In at least some embodiments, predicted attributes for more than one feature may be determined for each location 182, 184. In such embodiments, the prediction component 230 may, for each location 182, 184 in the location set 180, gather the predicted attributes for more than one feature and compute a performance metric value based on those predicted attributes. For example, in at least some embodiments, the prediction component 230 may apply a predetermined function to the predicted attributes for multiple features in order to compute a performance metric value. By way of example and not limitation, each feature may have a weighting value associated with that feature. The performance metric value may, in at least some embodiments, be calculated as the sum of the products of the predicted attribute of features and the weighting value associated with that feature. For example, in some embodiments, the multiple features may include the number of comments associated with a document (i.e. the first feature) and the number of inlinks associated with the document (i.e. the second feature). In such embodiments, the performance metric value may be calculated based on both a predicted attribute related to the number of comments expected to be associated with the document at some future time and a predicted attribute related to the number of inlink expected to link to the document at some future time.

The content monitoring module 280 may also include a scheduling component 232. The scheduling component 232 may determine a monitoring schedule 202 based on the predicted attributes and/or the performance metric values determined by the prediction component 230.

For example, the scheduling component 232 may schedule the monitoring of the locations 182, 184 in the location set 180 based on the predicted attributes and/or the performance metric values; locations which have higher predicted attributes and/or higher performance metric values may be placed higher on the monitoring schedule 202 (and thus monitored sooner) than locations with relatively lower predicted attributes and/or lower performance metric values.

In at least some embodiments, the scheduling component 232 may be configured to increase the rank of a location in the monitoring schedule 202 if that location becomes stale. For example, the rank of a location may be increased based on the period of time which has elapsed since the location was last monitored. The period of time may be measured, for example, in terms of the number of fetching or monitoring operations which have occurred by the monitoring component 234 since the location was last monitored. In some embodiments, the rank of a location in the monitoring schedule 202 may be increased by increasing the performance metric value associated with that location. For example, the predicted performance metric could be incremented by a predetermined amount for every thousand fetching operations. It will be appreciated however, that a thousand fetching operations is intended to be illustrative and that other thresholds may be used.

It will be appreciated that the division of functions between components could, in some embodiments, be different than that specifically described above. That is, any functions provided by any one of either the prediction component 230, scheduling component 232 and monitoring component 234, could be performed by another component, module, or system. For example, any one or more of the components 230, 232, 234 or modules 280 may be logically or physically organized in a manner that is different from the manner illustrated in FIG. 2.

It will also be appreciated that, while the location set 180 and the monitoring schedule 202 are depicted in FIG. 2 using separate blocks, in at least some embodiments, the location set 180 and the monitoring schedule 202 may be a single element. For example, a single list of locations may serve as both a location set 180 and a monitoring schedule 202. For example the order of the listing of locations in the location set 180 may define the order of monitoring.

Figure 3:
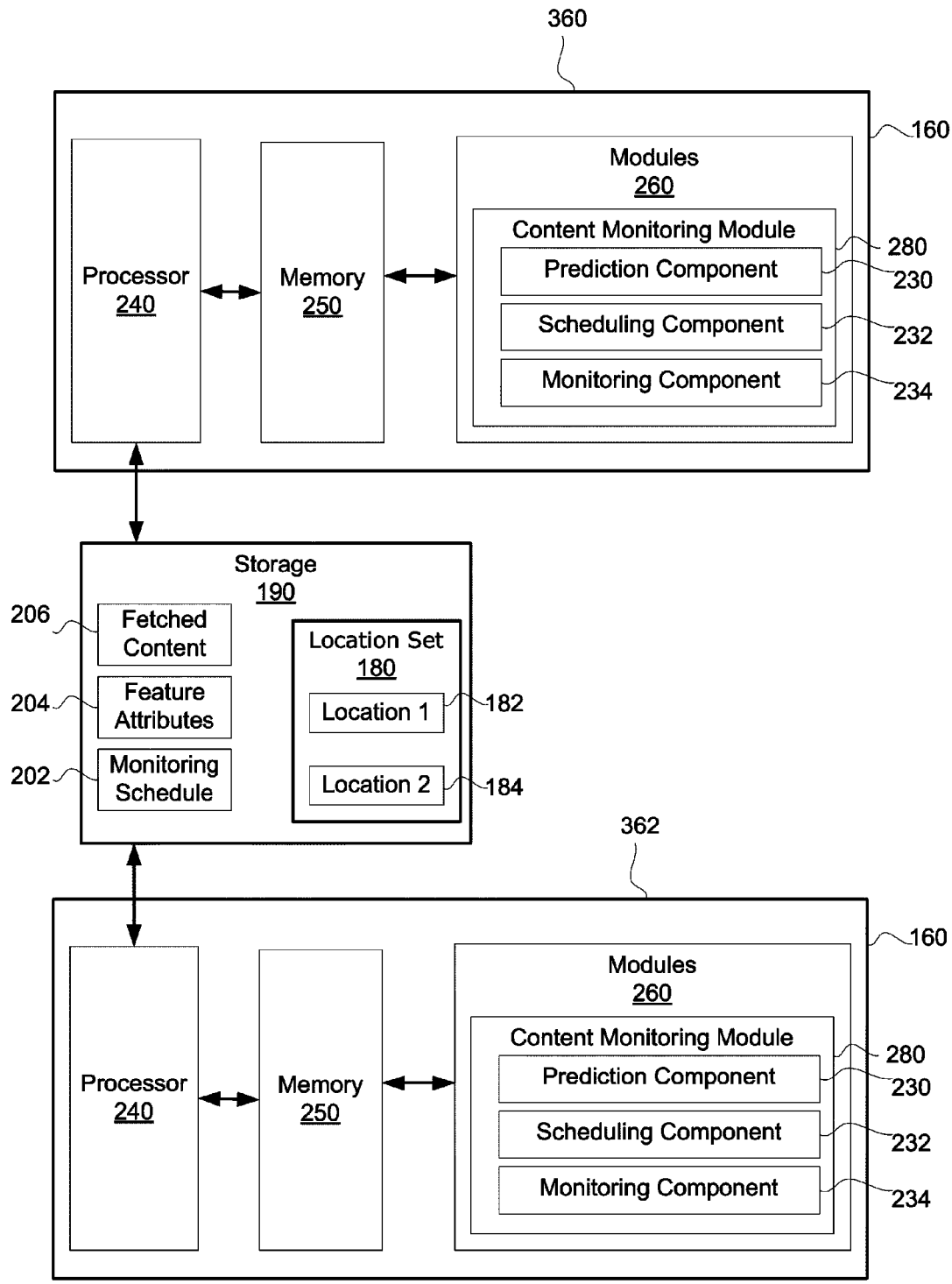
FIG. 3 shows a block diagram of a content monitoring system in accordance with a further embodiment of the present disclosure.

Referring now to FIG. 3, a block diagram of a further example of content monitoring systems 160 is illustrated. In the example of FIG. 3, a first content monitoring system 360 and a second content monitoring system 362 are connected to a common storage 190. The first content monitoring system 360 and the second content monitoring system 362 may retrieve and update data which is common to both content monitoring systems 360 and 362. For example, the first content monitoring system 360 and the second content monitoring system 360 may share fetched content 206, feature attributes 204, a monitoring schedule 202 and/or a location set 180. Due to the sharing of data, the capacity of the system to monitor documents may be increased simply by adding additional content monitoring systems 160.

It will be appreciated that, while FIG. 3 illustrates an example where two content monitoring systems 160 are used in order to provide additional capacity, in other embodiments, additional content monitoring systems 160 could be used in order to provide greater capacity.

Figure 4:
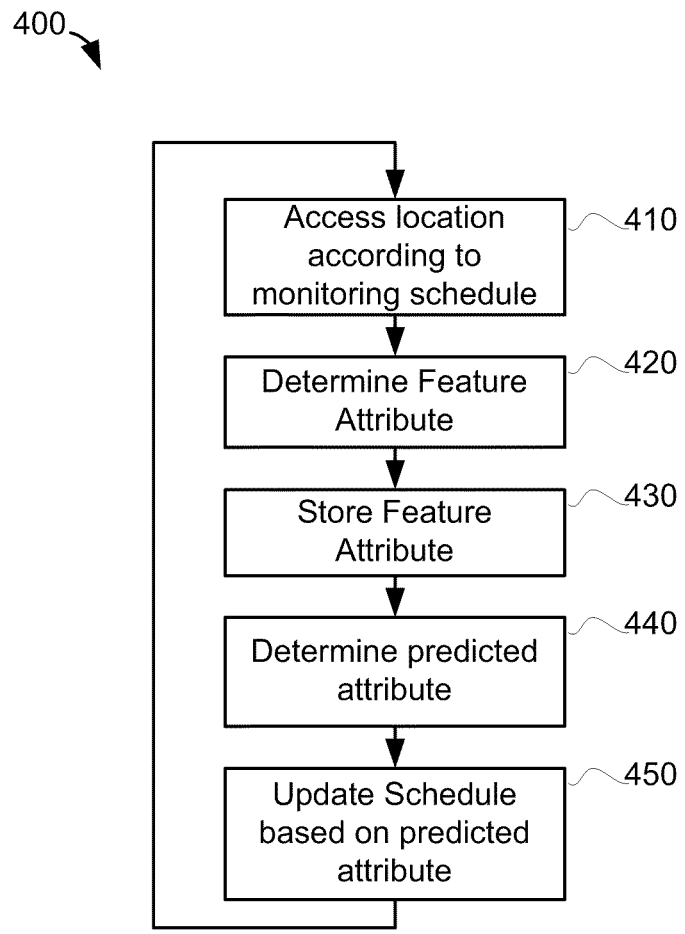
FIG. 4 shows a flowchart of a process for monitoring content in accordance with an embodiment of the present disclosure.

Referring now to FIG. 4, a process 400 for monitoring content stored at a plurality of locations 182, 184 (FIG. 1) in a location set 180 (FIG. 1) is illustrated in flowchart form. The process 400 includes steps or operations which may be performed by the content monitoring system 160 of FIGS. 1 to 3. In at least some embodiments, the content monitoring module 280 may be configured to perform the steps or operations of the process 400 of FIG. 4. The steps or operations of the process 400 of FIG. 4 may be performed by one or more of the prediction component 230, the scheduling component 232 and/or the monitoring component 234 of FIG. 2. That is, the content monitoring module 280, the prediction component 230, the scheduling component 232 and/or the monitoring component 234 may contain instructions for causing the processor 240 to execute the process 400 of FIG. 4.

First, at step 410, the monitoring component 234 of the content monitoring module 280 may retrieve a monitoring schedule 206 (FIG. 2) from storage 190 and may access a location 182, 184 in a location set 180 according to the monitoring schedule 202. The monitoring schedule 202 specifies the order in which the content of electronic documents 120a, 120b at locations 182, 184 of the location set 180 are monitored.

The monitoring schedule 202 may, in at least some embodiments, act as a queue which lists locations 182, 184 in the order in which they are to be monitored. For example, in at least some embodiments, the monitoring component 234 will monitor the documents at the locations 182, 184 in the monitoring schedule 202 in the order in which they are listed in the monitoring schedule 202. In such embodiments, the location accessed at step 410 may be the location at the top of the queue.

The monitoring schedule 202 may, at least initially, be randomly or arbitrarily determined. For example, all of the locations 182, 184 in the location set 180 may be added to the monitoring schedule 202 in a random or arbitrary manner. Other methods of initializing the monitoring schedule 202 are also possible. As will be explained in greater detail below, the monitoring schedule 202 will be updated in a manner which permits locations to be monitored in a dynamic manner. That is, the monitoring schedule 202 is not simply a fixed schedule in which locations are always monitored in the same predetermined order. The order of monitoring will vary as described below.

Step 410 includes a step of retrieving the electronic document 120a, 120b at the location 182, 184 specified by the monitoring schedule 202. Step 410 may also include a step of saving the electronic documents 120a, 120b to the storage 190. That is, the monitoring component 234 may, in various embodiments, be configured to fetch the electronic documents 120a, 120b from their respective locations 182, 184 and to save the electronic documents 120a, 120b to the storage 190. For example, the electronic documents 120a, 120b may be saved in a fetched content 206 portion of the storage 190.

In at least some embodiments, monitoring electronic documents 120a, 120b at step 410 may include monitoring documents referred to and/or linked to in the electronic documents 120a, 120b located at the locations 182, 184 in the location set 180. For example, the document 120a, 120b located at a location 182, 184 may, in some embodiments, be a cascaded data object such as an RSS feed. In such cases, the monitoring component 234 may be configured to visit locations referred to or linked to in the document that is an RSS feed, when monitoring that document. That is, the monitoring component may visit locations referred to or linked to in an RSS document in order to retrieve and/or fetch content from other documents located at the referred-to or linked-to locations.

In at least some embodiments, at step 410, the monitoring component 234 may be configured to perform a duplication checking analysis on fetched content 206 before saving the content to the storage 190. The monitoring component 234 may compare the fetched content with fetched content already saved to the storage 190. If the monitoring component 234 determines that the content has not already been saved to the storage, it may save the content to the storage 190. Alternatively, if the monitoring component 234 determines that the content has already been saved to the storage, it may not re-save the content to the storage 190.

Next, at step 420, the monitoring component 234 may analyze the retrieved electronic documents 120a, 120b located at the location 182, 184 specified by the monitoring schedule 202 to determine one or more feature attributes 204 associated with features of the electronic documents 120a, 120b. Each feature attribute 204 may be related to a feature of the electronic documents 120a, 120b at a specific point in time. In at least some embodiments, the feature attribute 204 may be related to a feature of the electronic document 120a, 120b at the point in time in which the electronic documents 120a, 120b are fetched from their respective locations 182, 184. The time which is related to each feature attribute 204 is, generally, a time which has already passed. Thus, the feature attributes 204 may, in at least some embodiments, be referred to as historic attributes.

Each feature attribute may be a value, quantifier, or other attribute associated with a feature of an associated electronic document 120a, 120b at an associated point in time. That is, the feature attributes 204 serve to quantify features. Each feature attribute 204 is associated with both a feature and a location.

The features of the electronic documents 120a, 120b represent information about the electronic document 120a, 120b which may be used to determine how frequent the location 182, 184 associated with the document 120a, 120b will be monitored. That is, features are characteristics associated with the electronic document 120a, 120b which may be used in order to determine how often the location 182, 184 of the document 120a, 120b should be revisited for monitoring and/or how the monitoring of the document 120a, 120b should be prioritized relative to the monitoring of other documents 120a, 120b.

The features may include one or more of: an indicator of whether the document was updated or not updated since a last visit, an indicator of the age of the document (for example, the elapsed time since the last change to the document), a quantifier of the number of comments associated with the electronic document 120a, 120b (for example, in the electronic document 120a, 120b is a web page which permits commenting, the comments may be a feature), and/or a quantifier of the number of inlinks associated with the electronic document 120a, 120b.

Inlinks are links, such as hyper-text links, which direct to the electronic document 120a, 120b. The number of inlinks is not determined from the document itself, but rather, from examining other documents to determine whether they link to the document.

The features may also include a feature which is a link analysis based ranking associated with the electronic document. For example, a PageRank™ associated with an electronic document 120 may be a feature of that electronic document 120a, 120b. The specific value or other quantifier of the feature for each document 120a, 120b at an associated time is the attribute for that feature. For example, a specific PageRank™ value associated with a specific electronic document 120a, 120b at a specific point in time may be a feature attribute of a PageRank feature for that electronic document 120a, 120b.

Other features apart from those specifically discussed above are also possible.

Next, at step 430, the feature attribute 204 which is determined by the monitoring component 234 may be saved to storage 190 associated with the content monitoring system 160. In at least some embodiments, the feature attributes 204 may be saved in a features database in the storage 190. The feature attributes 204 may be saved along with a time related to the feature attributes 204. That is, the feature attributes 204 may be saved in a time-series fashion. The time may, in at least some embodiments, be the time at which the feature attributes 204 were observed or determined. In at least some embodiments, the time may be saved using POSIX time convention. However, other time formats may also be used.

In at least some embodiments, the monitoring component 234 may be configured to only record a finite number of values associated with each feature for each location 182, 184 in the location set 180. This finite number may be defined by a feature attribute threshold. Once the feature attribute threshold is met, older feature attributes 204 may be removed from storage 190 in order to make room for the newer feature attributes. For example, in some embodiments, the monitoring component 234 may record only the last k-feature attributes 204 associated with each feature for each location.

Next, at step 440, the prediction component 230 may determine a first predicted attribute for the first feature associated with the location based on the historic feature attributes 204 for that first feature and that location.

That is, in at least some embodiments, the prediction component 230 may determine a future attribute for a first feature associated with the location accessed in step 410 based on historic feature attributes 204 for that first feature and that location. The prediction component 230 may attempt to determine future attributes of features based on previously observed attributes of that same feature.

The prediction component 230 may, in at least some embodiments, perform a regression analysis on historic attributes associated with a feature and the location accessed in step 410 in order to determine predicted attributes for that same feature and location.

In at least one embodiment, at step 440, a brown's double exponential smoothing method may be performed. In such embodiments, a predicted attribute for a feature and a location may be determined according to the following formula:

$$\bar{X}_n = (1-V_n) \cdot \bar{X}_{n-1} + V_n X_n$$

where:

$$V_n = \frac{V_{n-1}}{b_n + V_{n-1}},$$

$$b_n = (1-\alpha)^{t_n - t_{n-1}},$$

$$\bar{X}_0 = X_0,$$

$$V_0 = 1 - (1-\alpha)^q, \text{ and}$$

$$q = \frac{\sum_0^{n-1} |t_i - t_{i+1}|}{n+1}$$

Where $\bar{X}_n$ is the predicted attribute, $\alpha$ is a smoothing parameter, n is the number of historic attributes for the feature and location which are used to determine the predicted attribute, t is the time associated with a historic attribute (i.e. $t_n$ is the time for the $n^{th}$ historic attribute for that feature and that location). $\bar{X}_{n-1}$ is a last predicted attribute and $X_n$ is a feature attribute The smoothing parameter is a value which is, in at least some embodiments, between the range of zero (0) to one (1). In at least some embodiments, the smoothing parameter is approximately 0.1.

In other embodiments, an extended Holt's approach may be used to perform a regression analysis. In such embodiments, a linear regression step may be performed to create a regression line using historic feature attributes 204. More particularly, if we let $S_0=A$ and $T_0=B$, where A is the intercept of the regression line at $t_0$ and B is the slope of the linear regression line. The predicted attribute can be determined by iterating through the following steps:

$$S_{n+1} = (1-\alpha_{n+1}) \cdot [S_n + (t_{n+1} - t_n) \cdot T_n] + \alpha_{n+1} \cdot y_{n+1}$$

$$T_{n+1} = (1-\gamma_{n+1}) \cdot T_n + \gamma_{n+1} \cdot \frac{S_{n+1} - S_n}{t_{n+1} - t_n}$$

Where variable smoothing coefficients are given as:

$$\alpha_{n+1} = \frac{\alpha_n}{\alpha_n + (1-\alpha)^{t_{n+1} - t_n}}$$

$$\gamma_{n+1} = \frac{\gamma_n}{\gamma_n + (1-\gamma)^{t_{n+1} - t_n}},$$

where $\alpha \in (0,1)$ is a smoothing constant for the level and $\gamma \in (0,1)$ is a smoothing constant for the slope.

The predicted attribute may be calculated as:

$$X_{t+n}(t) = S_t + n \cdot T_t$$

In other embodiments, a linear regression method may be used to determine predicted attributes.

Next, at step 450, the monitoring component 232 may update the monitoring schedule 202 based on the predicted attribute determined at step 440. For example, the scheduling component 232 may, at step 450, schedule the monitoring of the locations 182, 184 in the location set 180 based on the predicted attribute determined at step 440. In at least some embodiments, locations which have higher predicted attributes may be placed higher on the monitoring schedule 202 (and thus monitored sooner) than locations with relatively lower predicted attributes.

The process 400 may then repeat itself so that the scheduling and monitoring of locations proceeds indefinitely, or until some predetermined stop condition is satisfied.

Figure 5:
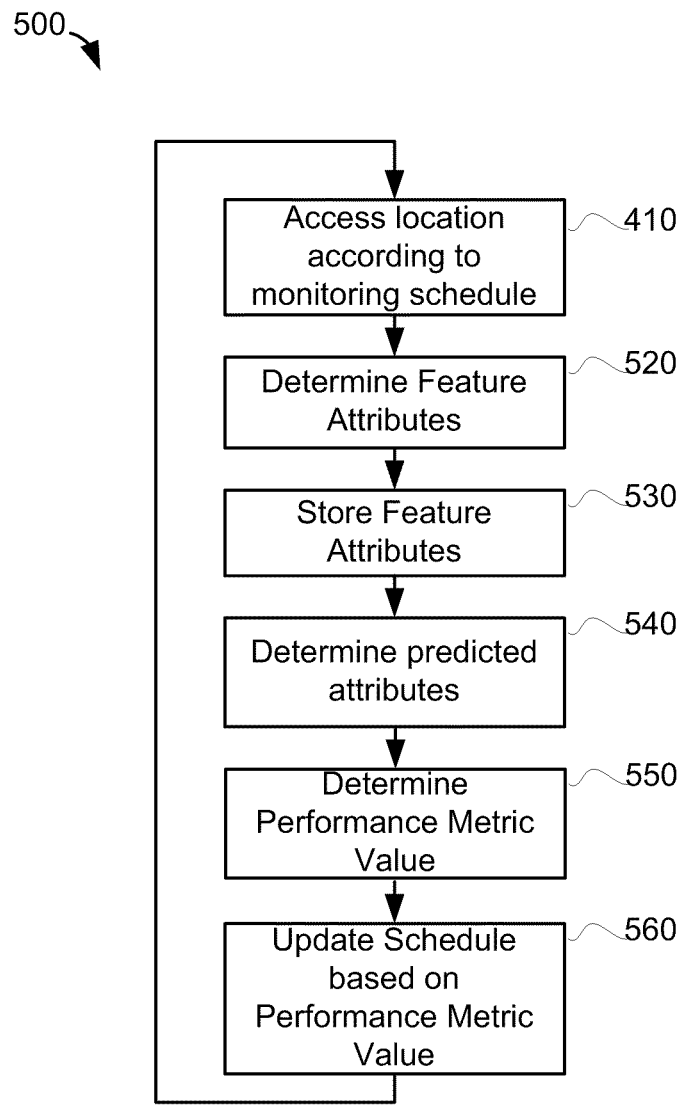
FIG. 5 shows a flowchart of a process for recognizing monitoring content in accordance with a further embodiment of the present disclosure.

Referring now to FIG. 5, a further process 500 for monitoring content stored at a plurality of locations 182, 184 (FIG. 1) in a location set 180 (FIG. 1) is illustrated in flowchart form. The process 500 includes steps or operations which may be performed by the content monitoring system 160 of FIGS. 1 to 3. In at least some embodiments, the content monitoring module 280 may be configured to perform the steps or operations of the process 500 of FIG. 5. The steps or operations of the process 500 of FIG. 5 may be performed by one or more of the prediction component 230, the scheduling component 232 and/or the monitoring component 234 of FIG. 2. That is, the content monitoring module 280, the prediction component 230, the scheduling component 232 and/or the monitoring component 234 may contain instructions for causing the processor 240 to execute the process 500 of FIG. 5.

The process 500 of FIG. 5 is similar to the process 400 of FIG. 4, except in that, in the process 500 of FIG. 5, the scheduling is made based on historic feature attributes 204 for more than one feature. Step 520 of FIG. 5 is similar to step 420 of FIG. 4, except in that, at step 520 of FIG. 5, feature attributes 204 for a plurality of features are determined. For example, in some embodiments, a feature attribute for a first feature and a feature attribute for a second feature may be determined.

The features may include one or more of: an indicator of whether the document was updated or not updated since a last visit, an indicator of the age of the document (for example, the elapsed time since the last change to the document), a quantifier of the number of comments associated with the electronic document 120a, 120b (for example, in the electronic document 120a, 120b is a web page which permits commenting, the comments may be a feature), and/or a quantifier of the number of inlinks associated with the electronic document 120a, 120b. The feature may also include a feature which is a link analysis based ranking associated with the electronic document 120a, 120b. For example, a PageRank™ associated with an electronic document 120 may be a feature of that electronic document 120a, 120b.

Other features apart from those specifically discussed above are also possible.

Similarly, step 530 of FIG. 5 is similar to step 430 of FIG. 4 except in that, at step 530 of FIG. 5, feature attributes for multiple features associated with a location are stored. Similarly, step 540 of FIG. 5 is similar to step 440 of FIG. 4 except in that, at step 540 predicted attributes for multiple features are determined.

Next, at step 550, the prediction component 230 may, for the location accessed at step 410, gather predicted attributes for more than one feature and compute a performance metric value based on those predicted attributes. For example, in at least some embodiments, the prediction component 230 may apply a predetermined function to the predicted attributes for multiple features in order to compute a performance metric value. By way of example and not limitation, each feature may have a weighting value associated with that feature. The performance metric value may, in at least some embodiments, be calculated as the sum of the products of the predicted attribute of features and the weighting value associated with that feature.

Next, at step 560, the monitoring component 232 may update the monitoring schedule 202 based on the performance metric values determined at step 550. For example, the scheduling component 232 may, at step 560, schedule the monitoring of the locations 182, 184 in the location set 180 based on the performance metric values determined at step 550. In at least some embodiments, locations which have higher performance metric values may be placed higher on the monitoring schedule 202 (and thus monitored sooner) than locations with relatively lower performance metric values.

Thus, in the embodiment of FIG. 5, the monitoring schedule 202 is determined in accordance with a plurality of predicted attributes. For example, in some embodiments, the monitoring schedule is determined in accordance with a first predicted attribute associated with a first feature and a second predicted attribute associated with a second feature.

Figure 6:
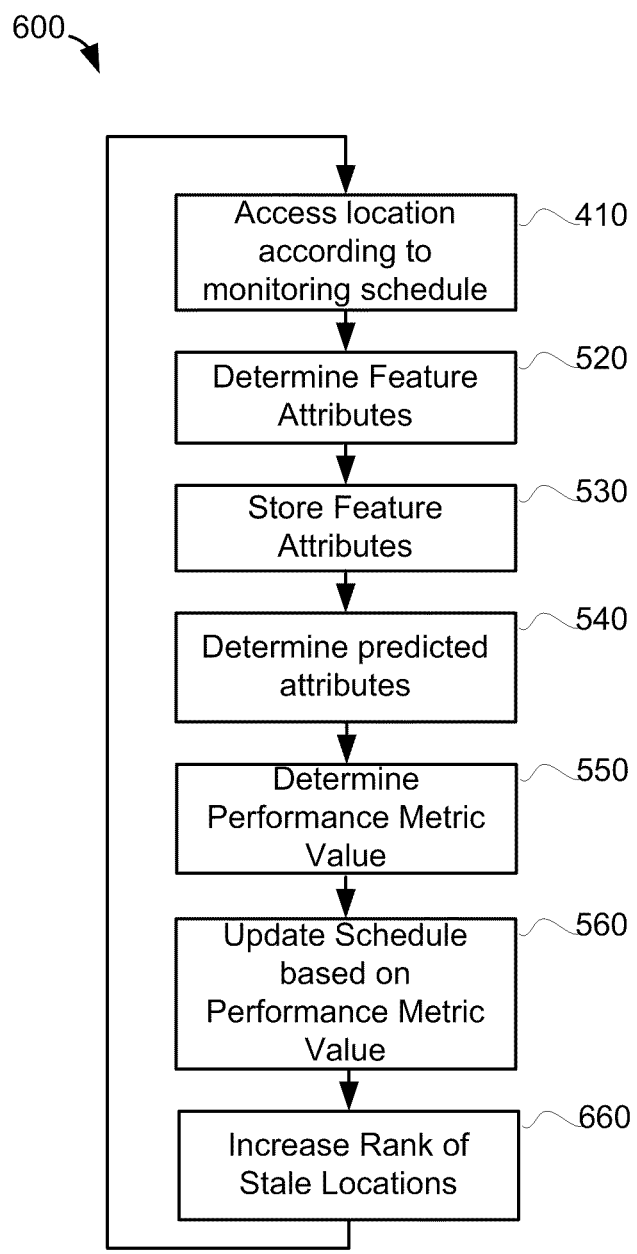
FIG. 6 shows a flowchart of a process for recognizing monitoring content in accordance with another embodiment of the present disclosure.

Referring now to FIG. 6, a further process 600 for monitoring content stored at a plurality of locations 182, 184 (FIG. 1) in a location set 180 (FIG. 1) is illustrated in flowchart form. The process 600 includes steps or operations which may be performed by the content monitoring system 160 of FIGS. 1 to 3. In at least some embodiments, the content monitoring module 280 may be configured to perform the steps or operations of the process 600 of FIG. 6. The steps or operations of the process 600 of FIG. 6 may be performed by one or more of the prediction component 230, the scheduling component 232 and/or the monitoring component 234 of FIG. 2. That is, the content monitoring module 280, the prediction component 230, the scheduling component 232 and/or the monitoring component 234 may contain instructions for causing the processor 240 to execute the process 600 of FIG. 6.

The process 600 of FIG. 6 is similar to the process 500 of FIG. 5 except in that it includes a further step 660 of increasing the ranking of stale locations in the monitoring schedule 202. At step 660, the scheduling component 232 may be increase the rank of a location in the monitoring schedule 202 if that location becomes stale. For example, the rank of a location may be increased based on the period of time which has elapsed since the location was last monitored. The period of time may be measured, for example, in terms of the number of fetching or monitoring operations which have occurred by the monitoring component 234 since the location was last monitored. In some embodiments, the rank of a location in the monitoring schedule 202 may be increased by increasing the performance metric value associated with that location. For example, the predicted performance metric could be incremented by a predetermined amount for every thousand fetching operations. It will be appreciated however, that a thousand fetching operations is intended to be illustrative and that other thresholds may be used.

It will be appreciated that variations of the methods and systems described above are also possible. For example, various embodiments may omit or modify some of the steps of FIGS. 4 to 6.

While the present disclosure is primarily described in terms of methods, a person of ordinary skill in the art will understand that the present disclosure is also directed to various apparatus, such as a server and/or a document processing system, including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, and articles of manufacture also come within the scope of the present disclosure.

While the processes 400, 500, 600 of FIGS. 4 to 6 have been described as occurring in a particular order, it will be appreciated by persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

The various embodiments presented above are merely examples. Variations of the embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of monitoring content stored at a plurality of locations in a location set, the method comprising:
   determining two or more historic attributes for a first feature associated with each location;
   for each location in the location set, determining a first predicted attribute for the first feature associated with that location based on the historic attributes for that first feature and that location;
   determining two or more historic attributes for a second feature associated with each location;
   for each location in the location set, determining a second predicted attribute for the second feature associated with that location based on the historic attributes for the second feature and that location;
   determining a monitoring schedule in accordance with the first predicted attribute and the second predicted attribute; and
   monitoring the content at the locations in the location set according to the monitoring schedule.

2. The method of claim 1, wherein the location references a web page and wherein at least some of the locations in the location set are universal resource locators.

3. The method of claim 1, wherein the first feature is the number of in-links referencing the location, and wherein each historic attribute for the first feature is the number of in-links referencing the location at an associated time.

4. The method of claim 1, wherein the first feature is a quantity of comments associated with the content at the location, and wherein each historic attribute for the first feature is the quantity of comments associated with the content at an associated time.

5. The method of claim 1, wherein each historic attribute has an associated time.

6. The method of claim 1, wherein monitoring the content at the locations comprises:
   retrieving the content according to the monitoring schedule; and
   saving the retrieved content to a memory.

7. The method of claim 1, wherein determining a first predicted attribute for the first feature associated with that location based on the historic attributes for that first feature and that location comprises: performing regression analysis using the historic attributes for the first feature of that location.

8. The method of claim 7, wherein the regression analysis is a brown's double exponential smoothing regression analysis.

9. The method of claim 8, wherein the regression analysis is an extended Holt's approach regression analysis.

10. The method of claim 1, wherein the time duration between successive historic attributes is variable.

11. A content monitoring system for monitoring content stored at a plurality of locations in a location set, the system comprising:
   a memory; and
   a processor coupled with the memory, the processor being configured to:
      determine two or more historic attributes for a first feature associated with each location;
      for each location in the location set, determine a first predicted attribute for the first feature associated with that location based on the historic attributes for that first feature and that location;
      determine two or more historic attributes for a second feature associated with each location; and
      for each location in the location set, determine a second predicted attribute for the second feature associated with that location based on the historic attributes for the second feature and that location,
      determine a monitoring schedule in accordance with the first predicted attribute and the second predicted attribute; and
      monitor the content at the locations in the location set according to the monitoring schedule.

12. The content monitoring system of claim 11, wherein the location references a web page and wherein at least some of the locations in the location set are universal resource locators.

13. The content monitoring system of claim 11, wherein the first feature is the number of in-links referencing the location, and wherein each historic attribute for the first feature is the number of in-links referencing the location at an associated time.

14. The content monitoring system of claim 11, wherein the first feature is a quantity of comments associated with the content at the location, and wherein each historic attribute for the first feature is the quantity of comments associated with the content at an associated time.

15. The content monitoring system of claim 11, wherein each historic attribute has an associated time.

16. The content monitoring system of claim 11, wherein the processor is further configured to:
   retrieve the content according to the monitoring schedule; and
   save the retrieved content to a memory.

17. The content monitoring system of claim 11, wherein determining a first predicted attribute for the first feature associated with that location based on the historic attributes for that first feature and that location comprises: performing regression analysis using the historic attributes for the first feature of that location.

18. The content monitoring system of claim 17, wherein the regression analysis is a brown's double exponential smoothing regression analysis.

19. The content monitoring system of claim 17, wherein the regression analysis is an extended Holt's approach regression analysis.

20. The content monitoring system of claim 11, wherein the time duration between successive historic attributes is variable.

* * * * *